United States Patent
Nordstrom Nord

(10) Patent No.: US 12,538,901 B1
(45) Date of Patent: Feb. 3, 2026

(54) ANTI-PULL LEASH SYSTEM

(71) Applicant: Andrea Raquel Nordstrom Nord, Mountlake Terrace, WA (US)

(72) Inventor: Andrea Raquel Nordstrom Nord, Mountlake Terrace, WA (US)

( * ) Notice: Subject to any disclaimer, the term of this patent is extended or adjusted under 35 U.S.C. 154(b) by 0 days.

(21) Appl. No.: 19/050,791

(22) Filed: Feb. 11, 2025

(51) Int. Cl.
*A01K 27/00* (2006.01)

(52) U.S. Cl.
CPC .......... *A01K 27/005* (2013.01); *A01K 27/002* (2013.01); *A01K 27/003* (2013.01); *A01K 27/008* (2013.01)

(58) Field of Classification Search
CPC .... A01K 27/00; A01K 27/001; A01K 27/002; A01K 27/003
See application file for complete search history.

(56) References Cited

U.S. PATENT DOCUMENTS

| | | | |
|---|---|---|---|
| 3,769,939 A | 11/1973 | Wais et al. | |
| 3,948,222 A | 4/1976 | Longshore et al. | |
| 4,060,056 A | 11/1977 | Maietta | |
| 5,611,298 A | 3/1997 | Sporn | |
| 5,632,234 A * | 5/1997 | Parker | A01K 27/003 119/795 |
| 5,713,308 A | 2/1998 | Holt, Jr. | |
| 5,743,216 A | 4/1998 | Holt, Jr. | |
| 6,213,057 B1 | 4/2001 | Franco et al. | |
| 6,401,666 B1 | 6/2002 | Kircher | |
| 6,539,897 B1 * | 4/2003 | Dossenback | A01K 27/003 119/799 |
| 7,165,511 B1 | 1/2007 | Brezinski | |
| 8,381,688 B1 | 2/2013 | Wejrowski | |
| 9,392,769 B2 * | 7/2016 | Van Bemmelen | A01K 27/003 |
| 11,439,128 B2 | 9/2022 | Dugan | |
| 2006/0112903 A1 | 6/2006 | Zutis et al. | |
| 2012/0012071 A1 * | 1/2012 | Hinojosa | A01K 27/003 24/265 R |
| 2012/0234261 A1 | 9/2012 | Nelson | |
| 2012/0318211 A1 | 12/2012 | Madonna et al. | |
| 2013/0074782 A1 | 3/2013 | Marran | |
| 2013/0160718 A1 | 6/2013 | Weaver-Pelaez et al. | |
| 2017/0347631 A1 * | 12/2017 | Dolan | A01K 27/003 |

(Continued)

FOREIGN PATENT DOCUMENTS

DE 10259679 A1 * 7/2004 ............. A01K 27/00

*Primary Examiner* — Kristen C Hayes
(74) *Attorney, Agent, or Firm* — Dunlap Bennett & Ludwig PLLC

(57) ABSTRACT

An anti-pull leash system for enhanced control and safety is disclosed. The leash system distributes the pulling force across multiple attachment points using a dual U-shaped leash design, ensuring control is maintained without requiring the owner to over-grip or lean back, reducing strain and discomfort. The secondary U-strap adds an additional layer of control, preventing the leash from being pulled too far in one direction. Additionally, the ergonomic handholds placed strategically along the leash allow the owner to comfortably manage the dog at various leash lengths, providing a tailored walking experience that keeps the dog comfortable while enhancing the owner's ability to control the dog in different situations. The bungee section absorbs shocks from sudden pulls, reducing the risk of injury to the owner and providing a safer, more comfortable walking experience for both the dog and the owner.

10 Claims, 3 Drawing Sheets

(56) References Cited

U.S. PATENT DOCUMENTS

| | | | |
|---|---|---|---|
| 2018/0279581 A1* | 10/2018 | Dugan | A01K 27/003 |
| 2019/0029225 A1* | 1/2019 | Dugan | A01K 27/002 |
| 2019/0059332 A1 | 2/2019 | Yun | |
| 2019/0380310 A1* | 12/2019 | Schneider | A01K 27/006 |
| 2020/0329677 A1* | 10/2020 | Dolan | A01K 27/003 |

* cited by examiner

ANTI-PULL LEASH SYSTEM

BACKGROUND OF THE INVENTION

The present invention addresses problems associated with controlling large or strong dogs during walks, including, but not limited to, preventing them from pulling excessively and reducing the risk of leash tangling, which can lead to discomfort and safety concerns for both the dog and the owner.

Most conventional leashes are single-point leads, forcing owners to over-grip or lean back to control large or strong dogs, often resulting in discomfort and loss of control. While some leashes offer a multi-point attachment, they lack a secondary loop to prevent over-pulling and do not include ergonomic handholds at multiple points, limiting control and comfort during walks and making it difficult to manage the dog at different leash lengths.

The present invention significantly improves upon existing leash systems by addressing the key shortcomings of single-point leads and basic multi-point designs.

SUMMARY OF THE INVENTION

The present invention is directed at an anti-pull leash system for enhanced control and safety during dog walks. By distributing the pulling force across multiple attachment points using a dual U-shaped leash design, the anti-pull leash system of the present invention ensures that control is maintained without requiring the owner to over-grip or lean back, reducing strain and discomfort.

The present invention comprises a primary U-shaped strap that connects to a front and rear section of a harness on the dog, and a secondary U-strap within the main U-shaped section which adds an additional layer of control, preventing the leash from being pulled too far in one direction and thus avoiding the common problem of losing control when a dog suddenly pulls. Additionally, the inclusion of ergonomic handholds placed strategically along the leash allows the owner to comfortably manage the dog at various leash lengths, providing a tailored walking experience that keeps the dog comfortable while enhancing the owner's ability to control the dog in different situations. The bungee section further enhances the design by absorbing shock from sudden pulls, reducing the risk of injury to the owner and providing a safer, more comfortable walking experience for both the dog and the owner. These features work together to create a more effective, comfortable, and user-friendly solution for managing large or strong dogs during walks.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention addresses problems associated with controlling large or strong dogs during walks, including, but not limited to, preventing them from pulling excessively and reducing the risk of leash tangling, which can lead to discomfort and safety concerns for both the dog and the owner.

Figure 1:
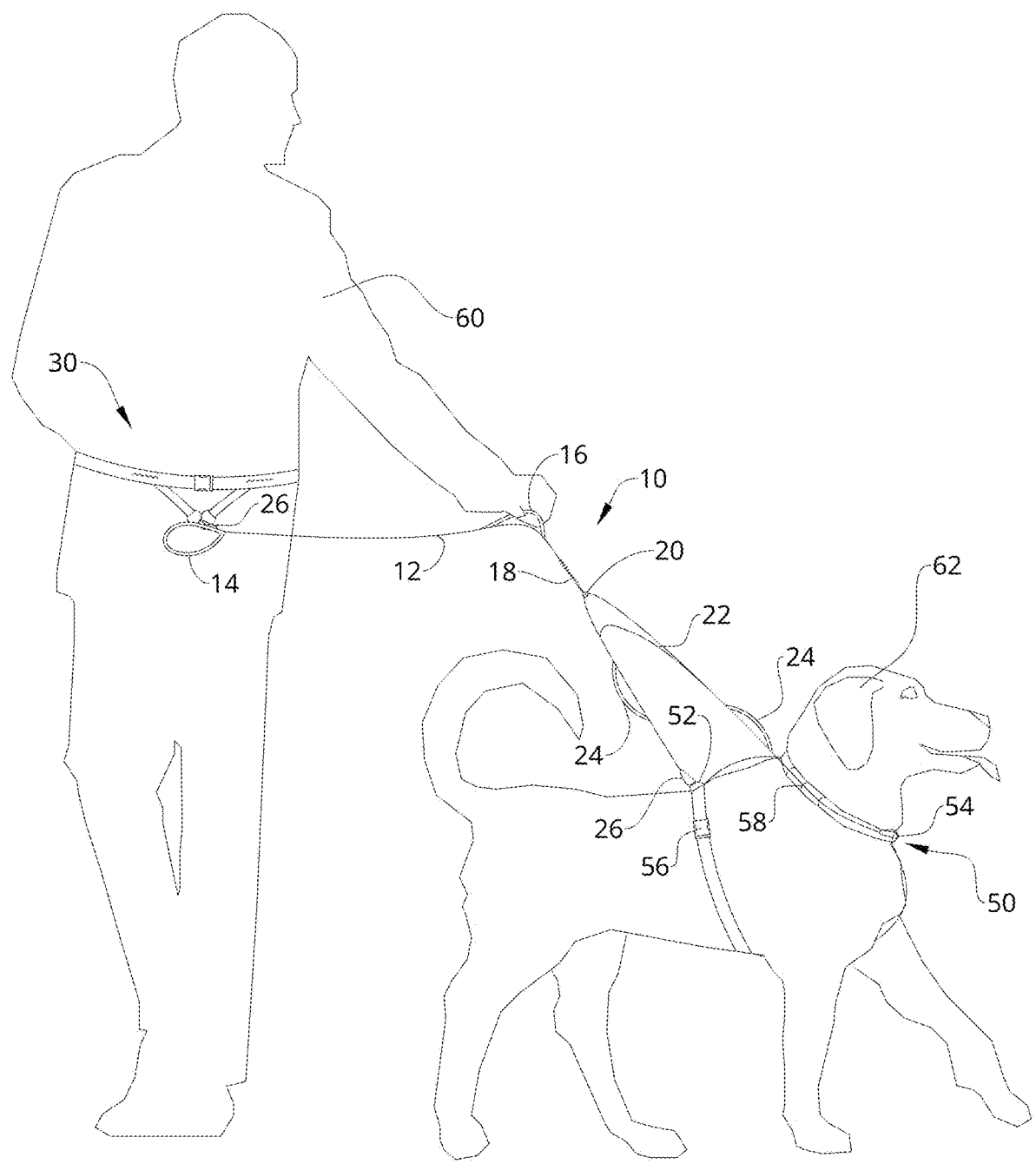
FIG. 1 is a schematic view of an anti-pull leash system in accordance with a preferred embodiment of the present invention, shown in use.

Broadly, in a preferred embodiment the anti-pull leash system of the present invention comprises a belt, a leash, and a harness. As seen in FIG. 1, the belt 30 is designed to be worn by a user 60. The leash 10 is attached to belt 30 at one end and is attached to harness 50 at the other end. Harness 50 is designed to be worn by dog 62. As described in more detail below, belt 30, leash 10, and harness 50 work together to aid in controlling large or strong dogs during walks.

Figure 2:
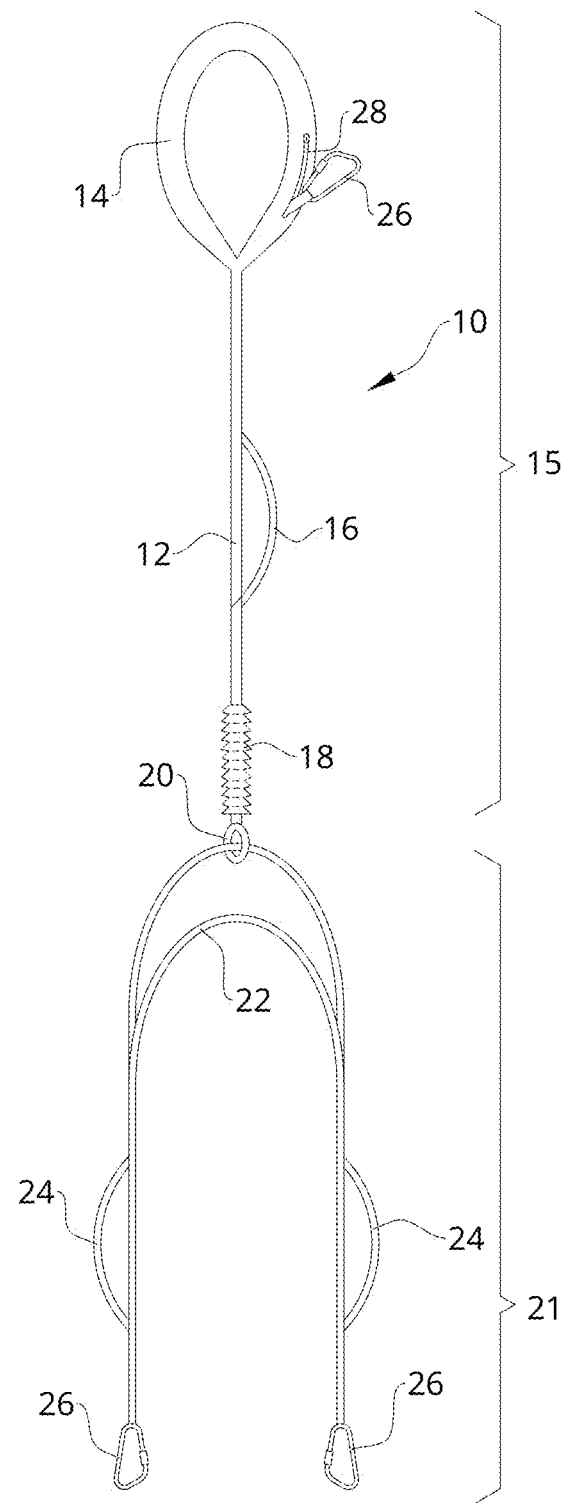
FIG. 2 is a side view of an anti-pull leash in accordance with a preferred embodiment of the present invention.

As seen by way of example in FIG. 2, leash 10 of the present invention comprises a U-shaped leash section 21 with dual auto-locking carabiners 26 that attach to both the front and back of the harness 50, providing enhanced control over the dog's movements. A secondary, smaller U-strap 22 within the main U-shaped section 21 prevents the leash from being pulled too far in one direction, ensuring the owner maintains control. Additionally, multiple cushioned handholds 24 along the leash offer comfortable and secure grip points, allowing the owner to manage the dog's movements effectively while minimizing strain.

As seen by way of example in FIG. 2, the U-shaped leash section 21 is connected to a handle/strap section 15, which broadly comprises a bungee section 18, a strap extension 12 and a handle 14. In a preferred embodiment, strap extension 12 also comprises a padded handhold 16 between bungee section 18 and handle 14. In a preferred embodiment, handle 14 comprises an auto locking carabiner 26 and a hidden compartment 28. Handle/strap section 15 is attached to U-shaped leash section 21 via a free movement loop 20.

Figure 3:
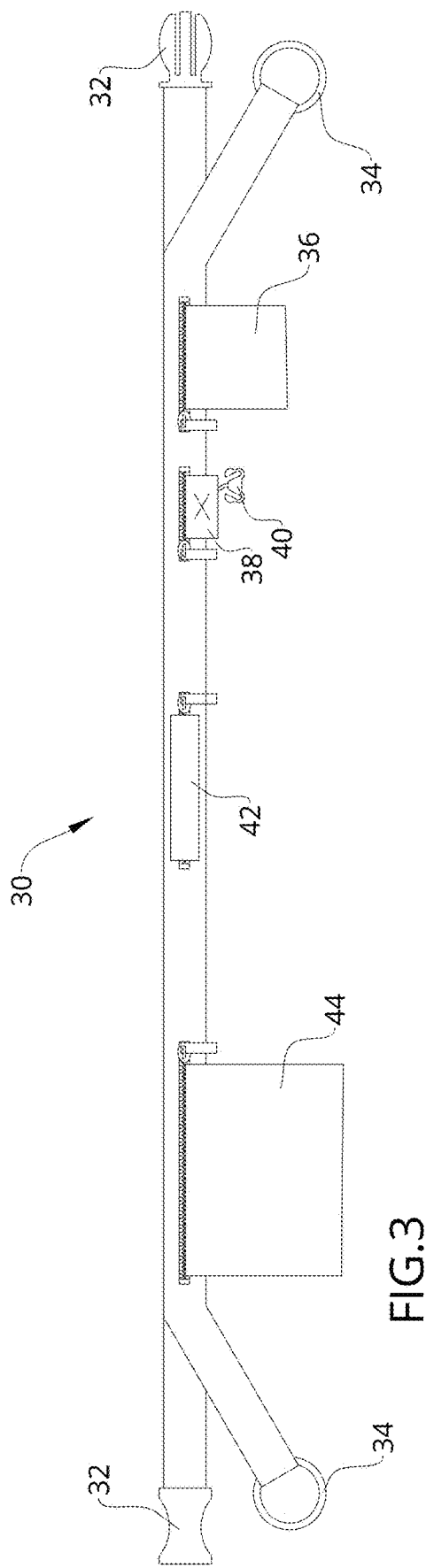
FIG. 3 is a side view of a belt for use in connection with an anti-pull leash system in accordance with a preferred embodiment of the present invention.

FIG. 3 depicts a belt 30 constructed in accordance with a preferred embodiment of the present invention. Belt 30 is designed to be worn by a user 60 and comprises a buckle 32 at each end to secure belt 30 to the user. First and second connecting rings 34 are positioned at each end of belt 30 and can be used to attach leash 10 to belt 30 (see FIG. 1). In a preferred embodiment, belt 3o also comprises a pocket 44 for storing a phone or keys (by way of example), and further comprises a pouch 36 for storing treats (by way of example). In addition, belt 30 can further comprise a poop bag holder 38 and a used poop bag holder 40, as well as elastic strap 42.

Figure 4:
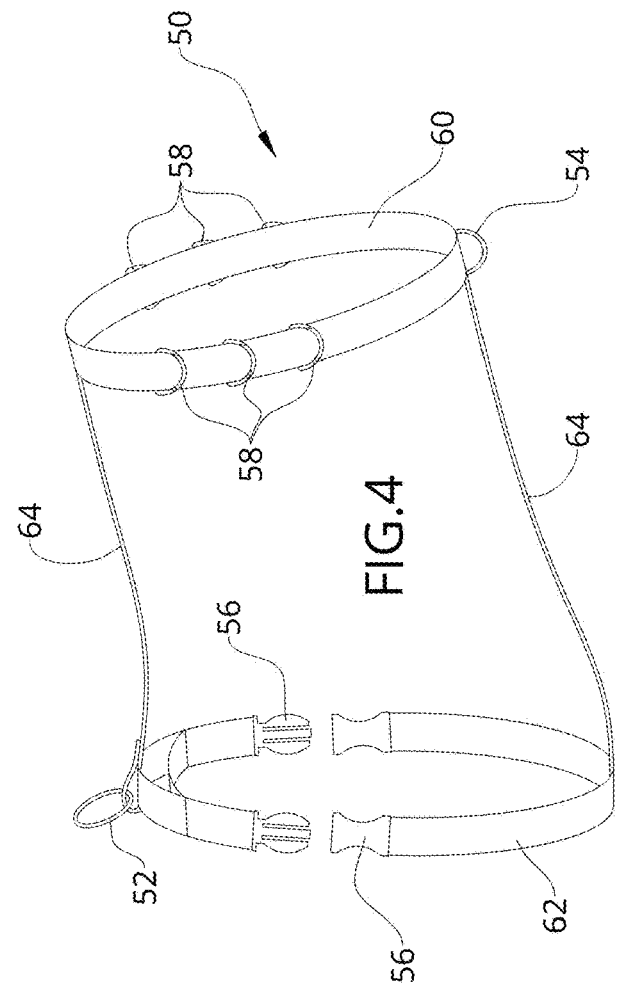
FIG. 4 is a side view of a harness for use in connection with an anti-pull leash system in accordance with a preferred embodiment of the present invention.

FIG. 4 shows a harness 50 constructed in accordance with a preferred embodiment of the present invention. Harness 50 is designed to be worn around the neck and front shoulder area of dog 62 (see FIG. 1). Broadly, harness 50 comprises a neck loop 60 and a shoulder loop 62 that are connected by first and second straps 64. Neck loop 60 further comprises dog leash clips 58 and front clip 54. In a preferred embodiment, shoulder loop 62 is designed to be opened via clips 56 so that harness 50 can be positioned on the dog, and includes back clip 52 for attaching leash 10 to harness 50. Leash 50 is further attached to harness 50 via front clip 54 as seen by way for example in FIG. 1.

The claimed invention differs from what currently exists. This invention is unique in its dual U-shaped leash design with a secondary U-strap, which offers superior control and auto-correction of pulling behavior, while the cushioned handholds and integrated safety features provide unmatched comfort and durability, setting it apart from existing leash systems.

Conventional leashes and leash systems do not work well because they concentrate all the pulling force on a single point, leading to discomfort, loss of control, and increased strain on the owner. Additionally, without a secondary loop or ergonomic handholds (as provided in the system of the present invention), they fail to effectively manage a dog's pulling behavior or provide the necessary control and comfort during walks.

The present invention significantly improves upon existing leash systems by addressing the key shortcomings of single-point leads and basic multi-point designs. By distributing the pulling force across multiple attachment points using a dual U-shaped leash design, it ensures that control is maintained without requiring the owner to over-grip or lean back, reducing strain and discomfort. The secondary U-strap 22 within the main U-shaped section 21 adds an additional layer of control, preventing the leash from being pulled too far in one direction and thus avoiding the common problem of losing control when a dog suddenly pulls.

Additionally, the inclusion of ergonomic handholds 24 placed strategically along the leash allows the owner to comfortably manage the dog at various leash lengths, providing a tailored walking experience that keeps the dog comfortable while enhancing the owner's ability to control the dog in different situations. The bungee section 18 further enhances the design by absorbing shock from sudden pulls, reducing the risk of injury to the owner and providing a safer, more comfortable walking experience for both the dog and the owner. These features work together to create a more effective, comfortable, and user-friendly solution for managing large or strong dogs during walks.

The Primary U-Strap (21) forms the main structure of the leash, connecting the Dual Auto-Locking Carabiners (26) to both the front and back of the harness (50). The Secondary Smaller U-Strap (22) is integrated within the Primary U-Strap to prevent excessive pulling in any direction, ensuring balanced control.

The Bungee Cord Section (18) is strategically attached above the attachment loop of the leash, allowing for controlled movement of the U-shaped section. This placement permits the U-section of the leash to move freely while still providing shock absorption during sudden pulls. Above the bungee section, there is a cushioned handle 16, followed by a length of straight lead that connects to the main cushioned handle 14 of the leash. This design ensures that the leash remains comfortable and functional while providing additional control and shock absorption.

The Cushioned Handholds (24/16) are distributed along the length of the leash 10, providing comfortable grip points for the owner. These handholds interact with the U-Shaped Leash Section (21) and Bungee Cord Section (18) to allow the owner to control the dog at various lengths and adjust the leash as needed during the walk.

The Leash Handle (14) is the primary interface for the owner and contains the Hidden Compartment (28) where the Locking Carabiner (26) is stored. The Leash Handle (14) is attached to the end of the U-Shaped Leash Section (21), allowing the leash to be securely held and easily attached to the Belt (30) when necessary.

The Harness (50) is worn by the dog and is the central point of attachment for the U-Shaped Leash Section (21). The Front Leash Ring (54) and Back "Nightingale" Clip (52) provide attachment points for the Dual Auto-Locking Carabiners (26), while the Six Leash Clip Loops (58) allow for flexible positioning of the leash to prevent tangling. The Harness Buckles (56) secure the harness on the dog, ensuring a snug fit.

The Hip Belt (30) is worn by the owner and is connected to the leash using the Locking Carabiner (26) from the Leash Handle (14). The Dual Ring Attachment Points (34) on the belt provide a secure connection for the leash, allowing for balanced force distribution when the dog pulls. The Compartments (44/38/36) in the belt are used for storing treats, waste bags, and personal items, ensuring the owner has everything needed for the walk.

The anti-pull leash system is designed with components that can work individually or together to provide optimal control, comfort, and safety during dog walks. Each product—the leash, harness, and hip belt—can be used on its own, offering significant benefits.

The primary components and their functions and relationships are further described below:
  U-Shaped Leash Section (21): The primary U-strap connects to the harness, distributing pulling force for better control. The secondary U-strap 22 prevents excessive movement, ensuring balanced control and auto-correction. Dual carabiners 26 secure the leash to the harness.
  Bungee Cord Section (18): Positioned above the attachment loop 20, the bungee absorbs shock from sudden pulls, reducing strain on the owner and enhancing comfort.
  Cushioned Handholds (24/16): Strategically placed along the leash, these handholds provide comfortable grip points, allowing the owner to adjust control based on the situation.
  Leash Handle (14): Contains a hidden compartment 28 for the locking carabiner 26, which attaches to the hip belt 30 for hands-free control.
  Dual Attachment Point Harness (50): The harness secures the dog with front and back attachment points (52/54), clip loops 58 to prevent tangling, and reflective material for visibility. Padded for comfort, the harness distributes force evenly and securely.
  Hip Belt (30): Adjustable and padded, the hip belt features dual ring attachment points 34 to distribute pulling force, preventing strain on the closure mechanism 32. It includes hidden compartments 44/42/38/36 for carrying essentials.
  In summary, while each product in the system is effective on its own, using them together delivers the best results, providing superior control, comfort, and safety during walks with large or strong dogs.

How to Make the Invention:
  To make the anti-pull leash system, follow these steps for each of the three main products: the leash, the harness, and the hip belt.
1. U-Shaped Leash Section
Materials:
  High-strength nylon or polyester webbing (for U-straps)
  Dual auto-locking carabiners
  Elastic bungee cord (3-5 inches)
  Cushioned material (e.g., neoprene or foam) for handholds
  High strength stitching thread
  Plastic or metal components for the hidden compartment
Steps:
  Cut and Prepare Materials: Measure and cut the webbing, bungee cord, and cushioned material.

Assemble U-Straps: Stitch the secondary U-strap within the primary U-strap and attach the carabiners.

Attach Bungee Cord: Connect the bungee cord above the leash attachment loop, allowing movement and shock absorption.

Add Cushioned Handholds: Attach cushioned handholds at intervals along the leash.

Construct Handle: Build the hidden compartment within the handle and attach it to the main leash.

2. Dual Attachment Point Harness

Materials:
Durable nylon or polyester webbing
Padded material (e.g., foam or neoprene)
Reflective fabric or tape
Metal or plastic rings and buckles
High strength stitching thread Steps:
Cut and Prepare Materials: Measure and cut webbing for the harness structure.
Assemble Harness: Stitch the webbing to form the harness, attaching rings and clip loops.
Add Padding and Reflective Material: Sew padding inside the harness and apply reflective fabric outside.
Attach Buckles: Secure buckles for easy adjustment and fit.

3. Hip Belt

Materials:
High-strength nylon or polyester webbing
Padded material for lining
Reflective fabric or tape
Dual metal rings
Heavy-duty plastic buckle
Zippers, fabric, and elastic bands for compartments Steps:
Cut and Prepare Materials: Measure and cut webbing and padding for the belt.
Assemble Belt: Sew padding to the belt, attach dual rings, and integrate hidden compartments with zippers.
Attach Buckle: Secure the heavy-duty buckle and apply reflective fabric.

The necessary elements of the anti-pull leash system are the U-shaped leash design, secondary U-strap, dual connection points, bungee cord section, and multiple cushioned handholds. These components are essential for control, shock absorption, and comfort. Optional elements include reflective materials, hidden compartments, and storage pockets, which enhance safety and convenience but are not critical. Adding features like adjustable leash length, quick-release buckles, or a modular attachment system could further improve functionality and user convenience.

How to Use the Invention:

To use the anti-pull leash system effectively and solve the problem of controlling large or strong dogs during walks, a person would follow these steps:

1. Harness Setup:

Put on the Harness: Slide the harness over the dog's head, ensuring the padded head loop fits comfortably around the dog's neck.

Secure the Harness: Buckle the harness behind the dog's front legs using the adjustable buckles, making sure the fit is snug but not too tight. The harness should be positioned so that the front leash ring is centered on the dog's chest, and the back "Nightingale" clip is aligned along the dog's spine.

2. Leash Attachment:

Connect the Leash to the Harness: Attach the dual auto-locking carabiners on the U-shaped leash section to the front leash ring and the back "Nightingale" clip on the harness. Ensure both connections are secure.

Position the Leash: Adjust the leash so that it runs smoothly along the side of the dog, using the six leash clip loops on the harness to prevent the leash from falling between the dog's feet and getting tangled.

3. Using the Leash:

Grip the Leash: Hold the leash by the cushioned handholds, which are spaced along the leash. Choose the handhold that provides the most control based on your environment—closer to the dog in crowded areas or further away in open spaces.

Walk the Dog: Begin walking with the dog. If the dog starts to pull, the U-shaped section and secondary U-strap will help distribute the pulling force evenly, while the bungee cord absorbs shock from sudden movements. The leash's design will gently correct the dog's pulling behavior, reducing the strain on your arm and maintaining control.

4. Optional Hip Belt Use:

Attach the Leash to the Hip Belt: If you prefer a hands-free experience, Adjust the Belt: Secure the hip belt around your waist, adjusting the padded lining for comfort. Make sure the belt is snug but comfortable, and that the leash is properly attached.

Attach the leash: Using the hidden locking carabiner in the leash handle, attach to the dual rings on the hip belt. Ensure that both rings are connected to evenly distribute the pulling force across your hips.

Store Essentials: Use the hidden compartments in the hip belt to store treats, waste bags, and other essentials, keeping your hands free during the walk.

5. Adjust and Continue:

Monitor and Adjust: Throughout the walk, monitor the dog's behavior and adjust your grip or the leash's position as needed. If the dog continues to pull, the U-shaped design and bungee cord will work together to maintain control and reduce strain.

By following these steps, the person can effectively manage a large or strong dog during walks, reducing pulling behavior and enhancing both the dog's and the owner's comfort and safety. The system is designed to work best when all components are used together, but each component can also be used individually to achieve significant improvements in control and comfort.

It should be understood, of course, that the foregoing relates to exemplary embodiments of the invention and that modifications may be made without departing from the spirit and scope of the invention as set forth in the following claims.

What is claimed is:

1. An anti-pull leash system comprising a leash and a harness, wherein the leash comprises a U-shaped section and a handle section, wherein the U-shaped section comprises a primary U-shaped strap that has a first leg having a first carabiner at the end of the first leg, and a second leg having a second carabiner at the end of the second leg, and further comprises a secondary smaller secondary U-shaped strap having a first leg attached to the first leg of the primary U-shaped strap and a second leg attached to the second leg of the primary U-shaped strap, and further comprises a first handle on the first leg of the primary U-shaped strap and a second handle on the second leg of the primary U-shaped strap, and wherein the handle section comprises a bungee section at one end and a handle portion at the opposite end, and wherein the bungee portion is attached to the U-shaped section.

2. The anti-pull leash system of claim 1, wherein the harness comprises a neck loop designed to be placed over the neck of a do, and a shoulder portion designed to be positioned behind the front shoulders of the dog, and wherein the neck loop comprises a first clip and wherein the shoulder loop comprises a second clip, and wherein the first carabiner on the U-shaped strap connects to the first clip and the second carabiner on the U-shaped strap connects to the second clip.

3. The anti-pull leash system of claim 1, wherein the primary U-shaped strap prevents the leash from being pulled too far in one direction.

4. The anti-pull leash system of claim 1, wherein the handle section comprises a handle at the opposite end of the bungee section and further comprises a padded handhold between bungee section and the handle.

5. The anti-pull leash system of claim 1, wherein the handle comprises a carabiner and a hidden compartment.

6. The anti-pull leash system of claim 1, wherein the handle section is attached to U-shaped leash section via a free movement loop.

7. The anti-pull leash system of claim 1, further comprising a belt designed to be worn by a user and comprising first and second connecting rings.

8. The anti-pull leash system of claim 7, wherein the leash is attached to the belt via the first and second connecting rings.

9. The anti-pull leash system of claim 7, wherein the belt also comprises a pocket for storing a phone or keys, a pouch for storing treats, and a poop bag holder.

10. The anti-pull leash system of claim 1, wherein the harness further comprises dog leash clips.

\* \* \* \* \*